Patented July 5, 1938

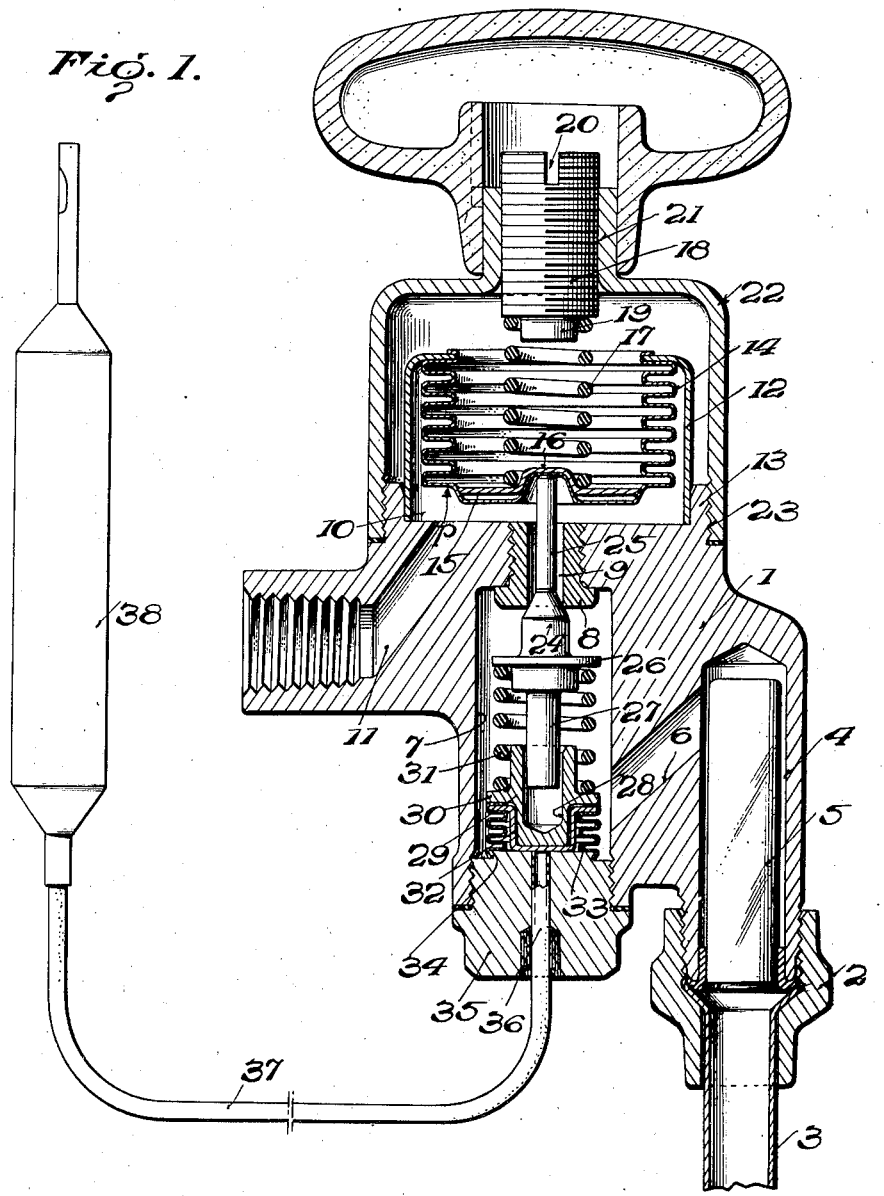

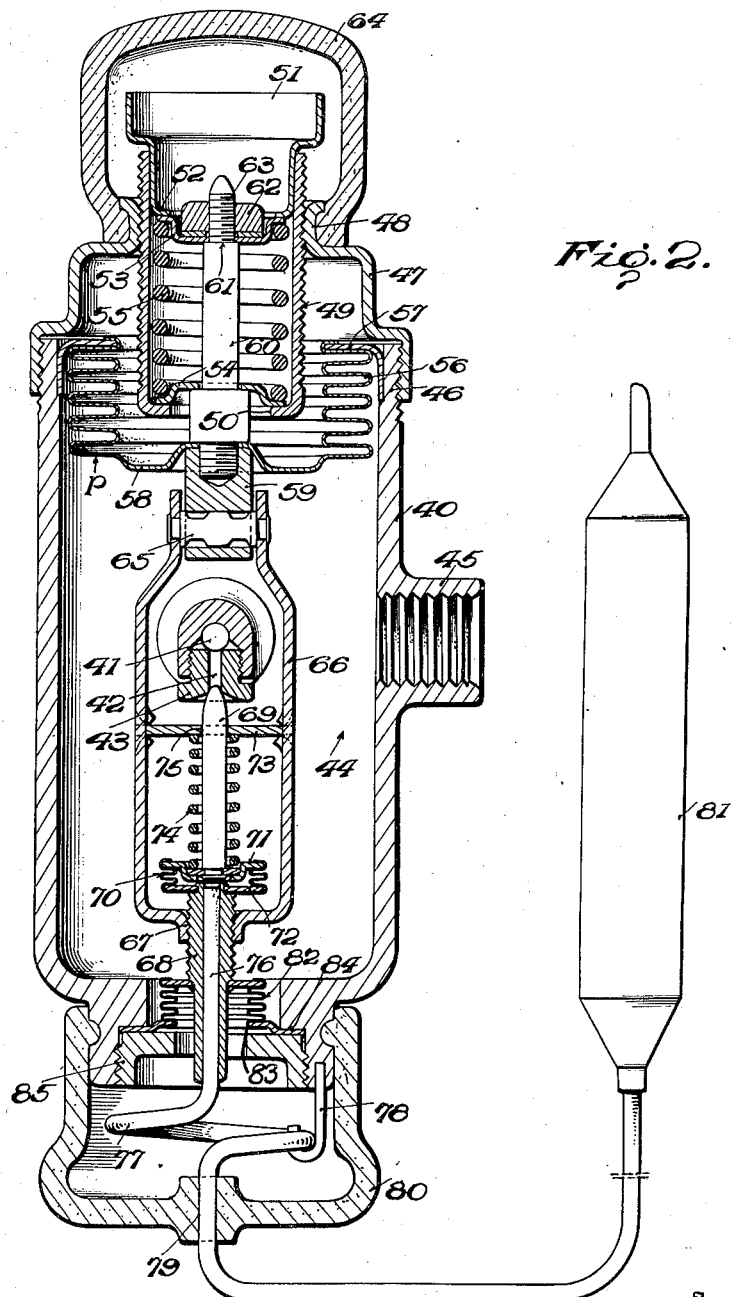

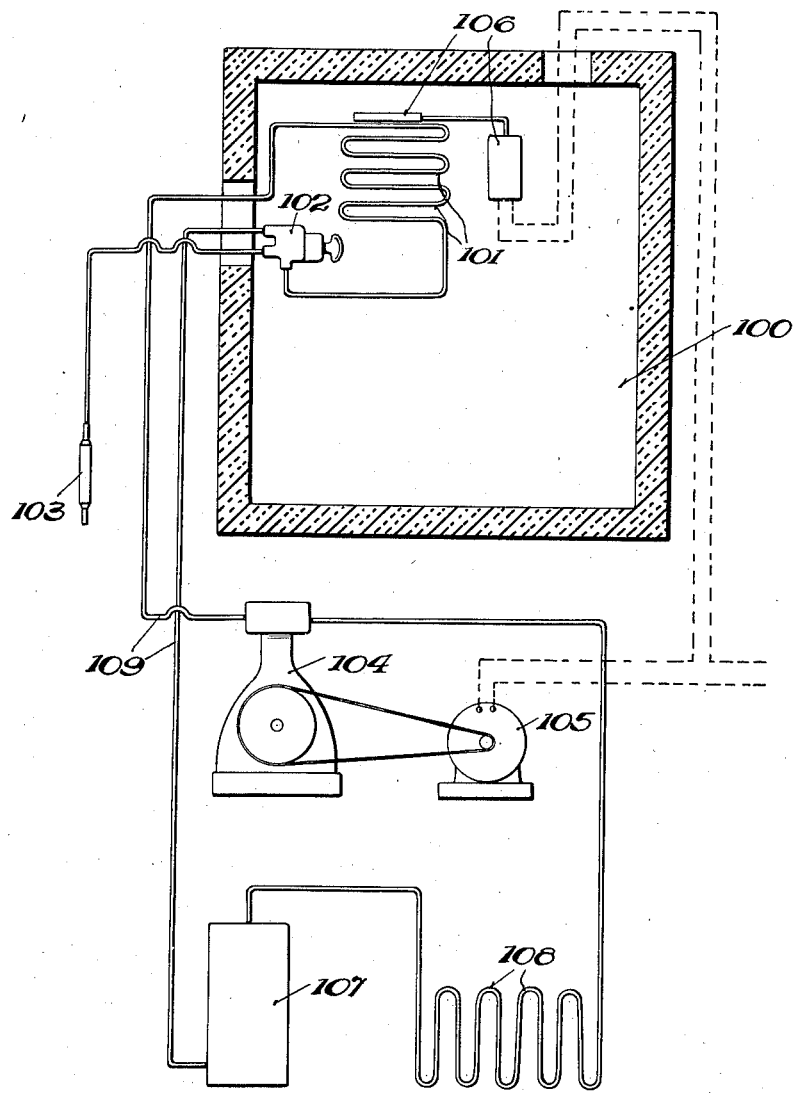

2,122,931

UNITED STATES PATENT OFFICE 2,122,931

EXPANSION VALVE WITH AUTOMATIC TEMPERATURE COMPENSATION

John E. Dube, Knoxville, Tenn., assignor to The Fulton Sylphon Company, Knoxville, Tenn., a corporation of Delaware Application July 9, 1934, Serial No. 734,342

14 Claims. (Cl. 62—3)

This invention relates to temperature compensating means for automatic pressure-controlling valves in refrigerating systems, and more particularly to means whereby the absolute pressure in the evaporator of a refrigerating machine may be automatically decreased and increased upon increase and decrease, respectively, of outside atmospheric temperature.

It has heretofore been proposed to provide the conduit of a refrigerating machine through which the liquid refrigerant flows to the evaporator with a valve which is controlled by a pressure responsive device to predetermine automatically the pressure in said evaporator. But it is sometimes desirable to vary the pressure in the evaporator as the temperature of the atmosphere outside of the space cooled by the evaporator increases and decreases, reducing the absolute pressure in the evaporator with increase of said atmospheric temperature and vice versa.

The present invention has for its object to provide automatic means for varying the pressure in the evaporator upon changes of atmospheric temperature.

Another object of this invention is to provide a device of the type characterized which is simple in construction, efficient in operation, inexpensive to manufacture, easy to adjust, and sensitive and accurate in determining the change in evaporator pressure that shall accompany changes of atmospheric temperature.

Other objects will appear as the description of the invention proceeds.

The invention is capable of receiving a variety of mechanical expressions, two of which are shown on the accompanying drawings, but it is to be expressly understood that the drawings are for purposes of illustration only, and are not to be construed as a definition of the limits of the invention, reference being had to the appended claims for that purpose.

In said drawings, Figs. 1 and 2 illustrate schematically two embodiments of the present invention, said figures showing the relationship and form of the parts of structures which will automatically vary the pressure in the evaporator of a refrigerating machine upon changes in atmospheric temperature, but without attempting to show the parts in their proportions as to dimensions, volumes, sizes, etc.; and Fig. 3 is a schematic view of a refrigerating machine equipped with the present invention.

In the form shown in Fig. 1, a valve casing 1 of any suitable size, construction and material has suitably attached thereto, as by the coupling 2, an inlet pipe 3 for the liquid refrigerant, said pipe communicating with a recess 4 in which is disposed a strainer 5. From the recess 4 a passage 6 leads to a chamber 7 in which the valve mechanism to be described is located. Suitably formed in a wall of said chamber 7 is a valve port and valve seat, here shown as provided by a thimble 8 threaded into an aperture in the wall of casing 1. Valve port 9 communicates with a chamber 10 from which leads a passage 10 11 that communicates with any suitable conduit for conveying the refrigerant to the evaporator.

Chamber 10, as here shown, is formed by an external generally cup-shaped rigid wall 12 which is suitably attached, as by soldering or brazing, to a rib 13 on the valve casing 1. Within said wall 12 is a pressure responsive member, here shown as a deeply corrugated, expansible and collapsible, tubular metal wall or bellows 14 having one end suitably sealed in an aperture of the wall 12 and its opposite end suitably connected to or formed integrally with a relatively rigid end wall 15, here shown as provided with a centrally depressed portion 16. Thus the end wall 15 is subjected to the pressure in the chamber 10, which in turn is substantially the pressure in the evaporator, and owing to the flexibility of the tubular wall 14 said end wall 15 may move in response to changes of pressure in the evaporator.

Pressure responsive wall 15 is loaded by a coil spring 17 which reacts between said movable end wall 15 and an abutment 18, preferably made adjustable so as to predetermine the pressure exerted on said end wall 15. As here shown said coil spring 17 is centered by the depressed portion 16 of the wall 15 and by a projection 19 on said abutment 18. Abutment 18 is illustrated as in the form of a screw having a suitable kerf in its end whereby it may be engaged by a screw driver or other suitable tool for threading the same into or out of an aperture 21 formed in a housing 22 which surrounds the pressure responsive device heretofore described and which is shown as attached to the valve casing 1 by a threaded connection 23.

Cooperating with the valve seat 8 is a valve member 24, here shown in the form of a cone, and projecting therefrom through the valve port 9 is a stem 25 which engages in the depression 16 in the end wall 15. Valve member 24 has formed thereon or suitably attached thereto a flange 26 and a rearwardly extending spindle 27 which is guided in the recess 28 of a flanged sleeve 29. Interposed between the flange 30 of said sleeve 29 and the flange 26 of said valve member 24 is a second coil spring 31 which acts in opposition to the coil spring 17 and tends to move the valve member 24 toward its seat.

Cooperating with the outer end of said sleeve 29, which constitutes a movable abutment for the spring 31, is the end wall 32 of a motor element of a thermostatic device, said end wall being shown as recessed to receive the end of said sleeve 29. Said motor element as here shown is formed by a deeply corrugated, expansible and collapsible, tubular metal wall or bellows 33 suitably attached to said recessed end wall 32, as by soldering or brazing, and having its opposite end suitably attached, as by soldering or brazing, to a ledge or rib 34 formed on a threaded plug 35 which closes the end of the chamber 7. Plug 35 has a passage 36 extending therethrough, and suitably attached in or to said plug, and communicating with said motor element 33, is a capillary tube 37 which leads to and communicates with a bulb 38, of any suitable size, construction and character, which is designed to be suitably mounted where it is subjected to the temperature of the atmosphere. Bulb 38, capillary tube 37 and the motor element 33 are completely filled with an expansible liquid, and in order to minimize error in the response of the thermostatic device to the temperature of the atmosphere the volume of the motor element 33 and the capillary tube 37 should be kept at a minimum.

Fig. 3 illustrates diagrammatically an embodiment of the present invention applied to the regulation of the evaporator pressure in a conventional refrigerating system wherein the space or box 100 of a refrigerating machine is shown as containing an evaporator 101 in communication with the casing 102 of a temperature compensated pressure controlling valve of the present invention, the same having a bulb 103, comparable to bulb 38 of Fig. 1, subjected to the temperature of the atmosphere outside of said space 100. The system as illustrated also includes the usual or any suitable compressor 104, driven by motor 105 under the control of a thermostatic switch 106, receiver 107 and condenser 108 communicating with evaporator 101 through suitable piping 109.

In operation, the pressure responsive device is subjected to the pressure in the chamber 10, here designated $p$, and as before noted this is substantially the pressure in the evaporator. In addition to the pressure $p$, wall 15 is subjected to the pressure of the coil spring 17 and, through valve member 24 and spindle 25, to the pressure of the coil spring 31. Therefore, the pressure $p$, when the pressures are balanced, is equal to the difference between the pressures exerted by the coil springs 17 and 31, and the desired pressure to be maintained in the chamber 10 can be determined by rotating the threaded abutment 18 so as to adjust the tension of the spring 17 until the desired difference in pressure exists between the springs 17 and 31. If thereafter the pressure in the chamber 10 tends to increase the end wall 15 is moved against the tension of the spring 17 by the combined action of said pressure and the pressure of spring 31, spring 31 moving the valve member 24 toward its seat 8 until a new balance is established. If the pressure in the chamber 10 decreases end wall 15 is moved by the spring 17 against the tension of the spring 31 and said pressure to open valve 24 until a new balance is established.

To vary the pressure $p$ automatically with changes in the temperature of the atmosphere, the tension of the spring 31 is automatically varied to change the difference in pressure exerted by the springs 17 and 31, and inasmuch as it is desired that the pressure $p$ be lowered with an increase in atmospheric temperature, the pressure exerted by the spring 31 should be increased with increases in atmospheric temperature to decrease the difference in the pressures exerted by said springs. This is effected by the mechanism of the present invention, because under increase in atmospheric temperature the liquid in the bulb 38 expands, and as said bulb, the capillary tube 37 and the motor element 33 are completely filled with said liquid, said expansion produces an expansion of the motor element 33, moving the flanged sleeve element 29 and increasing the tension of the spring 31.

This increase in the tension of the spring 31 is thus equivalent to a decrease in the tension of the spring 17 which is to balance the pressure $p$ on the end wall 15. Hence a new condition of balance is set up whereby the valve member 24 is moved to open and close the port in seat 8 to maintain a new pressure $p$ which is lower than that formerly existing. As the lower pressure is accompanied by a lower temperature the differential in temperature or heat gradient between the evaporator and the chamber being cooled thereby is increased, and greater inflow of heat into said chamber due to the increased atmospheric temperature is thus compensated for.

Conversely, a decrease in atmospheric temperature causes a contraction in volume of the liquid in said thermostatic device and a consequent decrease in the tension of said spring 31. Hence the pressure $p$ that is maintained in the chamber 10 is automatically decreased and increased with increase and decrease of the atmospheric temperature, respectively, because the difference in pressure exerted by the springs 17 and 31 is automatically decreased and increased respectively with said changes in temperature. In discussing the balance of pressures no reference has been made to atmospheric pressure as this may be regarded as a relatively constant value to be added to the tension of the spring 17 for any given condition of equilibrium.

Whereas in the embodiment of Fig. 1 the fluid pressure maintained by the pressure responsive device is determined by the differential pressure existing between the oppositely acting resilient means, and the temperature compensating device varies said differential, the fluid pressure maintained by the pressure responsive device may be determined by the tension of a single resilient means, and the temperature compensation may be effected entirely independently of the pressure responsive device, by varying the distance between the relatively movable valve member and its valve seat so as to vary the extent to which the resilient means must be flexed in order to bring about a predetermined change of pressure. An embodiment of the invention operating in the manner last referred to is shown in Fig. 2.

In this embodiment a valve casing 40 of any suitable size, construction and material has a suitable inlet connection for the liquid refrigerant, shown at 41, leading to a valve port 42 formed in a valve seat 43 integrally formed in or suitably mounted on the valve casing 40. Valve port 42 communicates with a chamber 44 in casing 40, and leading from said chamber 44 is an outlet connection 45 of any suitable character that is adapted to be connected to the evaporator.

As here shown, valve casing 40 is a generally cylindrical member threaded at one end as shown at 46, and mounted on said casing by said threads 46 is an end member 47 having an interiorly threaded aperture 48. Threaded into said aperture 48 is an exteriorly threaded tubular member 49 having an inwardly directed flange 50 at its inner end and having suitably secured to its opposite end a hand grasp 51, here shown as a cup-shaped member suitably attached to the end of the threaded member 49 as by soldering or brazing. The inner end of said hand grasp 51 has an inwardly directed flange 52 adapted to act as a stop for a spring-retaining plate 53. Interposed between said spring-retaining plate 53 and a second spring-retaining plate 54, which is designed to be seated on the inwardly directed flange 50, is a coil spring 55 for predetermining the pressure to be maintained by the pressure responsive device.

Said pressure responsive device, as in the embodiment of Fig. 1, is an expansible and collapsible member, shown as a deeply corrugated, tubular metal wall or bellows 56 having its outer end suitably attached, as by soldering or brazing, to a flange member 57 which in turn is suitably attached, as by soldering or brazing, to the end of the casing 40. The opposite end of said expansible and collapsible member 56 has integral therewith or suitably attached thereto a movable end wall 58 subjected to the pressure within the chamber 44. Attached to said wall 58 exteriorly thereof is an actuating post 59 and attached to said wall 58 interiorly thereof is a stem 60, here shown as threaded into said post 59 so as to clamp the end wall 58 between the two. Stem 60 has a shoulder 61 to which the spring-retaining plate 53 is clamped by nut 62 threaded on the projecting end 63 thereof, and the tension of the spring 55 may therefore be varied by threading the member 49 into and out of its aperture 48. A cover 64 for the adjusting mechanism, preferably made of rubber, may be suitably mounted on the member 47 so as to exclude atmospheric moisture and avoid interference with proper functioning from formation of ice. As in the embodiment of Fig. 1, the rotatable threaded element 49 constitutes an adjustable abutment for the coil spring 55 and predetermines the tension of said spring as applied through the spring plate 53 and stem 60 to the end wall 58. The pressure to be maintained in chamber 44 is thus predetermined by the tension of said spring 55, and when the pressure responsive device is in equilibrium the pressure of the fluid in the chamber 44 as applied to the end wall 58 and indicated by $p$ is balanced by atmospheric pressure and the resiliency of said spring 55.

Suitably attached to the post 59, as by a cross pin 65 projecting through an aperture in said post, is a yoke 66 having its opposite end provided with an interiorly threaded opening 67 in which is mounted the threaded stem 68 of a valve member 69 movable toward and away from the valve seat 43. Therefore, as the pressure within the chamber 44 is varied yoke 66 is moved by or against the tension of spring 55 to re-position the valve member 69 with respect to its seat 43 and reestablish a balanced pressure on the end wall 58. Thus if the pressure in the chamber 44 tends to increase, end wall 58 is moved upwardly, as viewed in the figure, by the spring 55, thereby moving valve member 69 toward its seat and decreasing the admission of refrigerant to chamber 44 until equilibrium is reestablished; conversely if the pressure in the chamber 44 tends to decrease end wall 58 is moved downwardly, as viewed in said figure, against the tension of spring 55, and valve member 69 is moved away from its seat, admitting more liquid refrigerant, until equilibrium is reestablished.

In order to adjust the pressure within the chamber 44 in accordance with changes of atmospheric temperature, means are provided for varying the relationship between the valve member 69 and its seat 43 independently of the operation of the pressure responsive device heretofore described. To this end an expansible and collapsible motor element is interposed between the threaded stem 68 and the valve member 69, said expansible and collapsible element being shown as formed by a deeply corrugated tubular metal wall or bellows 70, suitably attached to or formed integrally with end walls 71 and 72 respectively connected in any suitable way to said valve member 69 and said threaded stem 68. Interposed between end wall 71 and a transverse member 73 attached to the yoke 66 in any suitable way is a coil spring 74 which imposes a predetermined tension on the expansible and collapsible element 70, said transverse member 73 being provided with an aperture 75 through which the valve member 69 projects and wherein said valve member is guided in its rectilinear movements. Valve stem 68 is shown as provided with a passage 76 extending therethrough and attached to or suitably connected to said passage 76 is a flexible capillary tube 77 formed into a coil so that it is possessed of axial flexibility and suitably anchored to the end wall of the casing 40 by a bracket 78. Said capillary tube 77 extends through an aperture 79 in a cover member 80 for the casing 40, attached to said casing in any suitable way, and communicates with a bulb 81 of any suitable size, construction and character and designed to be mounted in any suitable way where it responds to changes in atmospheric temperature. As in the embodiment of Fig. 1, expansible and collapsible chamber 70 and capillary tube 77 should have a minimum volume, and said chamber and capillary tube and the bulb 81 are completely filled with an expansible liquid.

Upon an increase of atmospheric temperature the expansible liquid in the bulb 81 expands, causing an expansion of the chamber 70 against the tension of the spring 74 and moving the valve member 69 nearer to its seat 43, whereby a lower pressure is maintained in the chamber 44 since a greater tension of the spring 55 is required to effect a predetermined opening of the valve. Conversely, a contraction of the liquid in the bulb 81 results in a collapse of the chamber 70 under the action of the spring 74, and the valve member 69 is moved to a position more remote from its valve seat 43, whereby a higher pressure is maintained in the chamber 44 since a smaller tensioning of the valve 55 is required in order to obtain the predetermined valve opening.

In order to provide a seal where the valve stem 68 and capillary tube 77 pass through the end of the casing 40, and also to avoid the need for a lock nut on the stem 68, a bellows seal 82 is provided between the stem 68 and the end of the casing 40. As here shown, the bellows 82 is suitably attached, as by soldering or brazing, to end flanges 83 and 84, although one or both of said flanges may be formed integrally with the bellows 82 if preferred, and flange 83 is suitably attached to the stem 68, as by soldering or brazing, while flange 84 is clamped in a fluid-tight manner between a shoulder on the casing 40 and a ring nut 85 threaded into a threaded aperture in the end of the casing. When ring nut 85 is loosened the exteriorly projecting end of the stem 68 may be rotated so as to adjust the position of the stem 68 with respect to the yoke 66 and thereby initially predetermine the position of the valve member 69 with respect to its valve seat 43. The cover member 80, which may be made of rubber, excludes atmospheric moisture and avoids formation of ice in bellows 82 and about the coil of tube 77.

In this embodiment of the invention the valve member 69 closes against the pressure of the entering liquid, instead of with the pressure as in the embodiment of Fig. 1, and the adjustment for compensating for changes in atmospheric temperature are effected entirely independently of the pressure responsive device instead of by adjustment of the differential of the oppositely acting resilient means which predetermine the effective fluid pressure as in the embodiment of Fig. 1, but as in the embodiment of Fig. 1 the pressure to be maintained in the evaporator is determined by the adjustment of an abutment for the resilient means acting on the pressure responsive member, and the pressure within the chamber 44 is automatically varied with changes of atmospheric temperature because under increased atmospheric temperature a smaller effective fluid pressure is maintained within the chamber 44, and vice versa.

It will therefore be perceived that by the present invention means have been provided for automatically varying the absolute pressure existing in the evaporator with changes in atmospheric temperature, i. e. as the temperature of the outside air increases, the pressure, and therefore the temperature, in the evaporator is lowered, so as to increase the temperature differential between the outside air and the evaporator, and vice versa, and this has been effected by a device which is relatively simple in construction and which has parts that are inexpensive to manufacture and easy to assemble. The pressure to be maintained may be initially predetermined by the adjustment of the abutment for the resilient means which predetermines the action of the pressure responsive device, and thereafter the pressure will be accurately and automatically varied with the atmospheric temperature owing to the fact that the pressure required to close the valve is predetermined by the definite and invariable volumetric expansion and contraction of the liquid in the bulb subjected to atmospheric temperature.

While the embodiments of the invention illustrated on the drawings have been described with considerable particularity, it is to be expressly understood that the invention is not to be restricted thereto, as the same is capable of receiving a variety of mechanical expressions, some of which will now readily suggest themselves to those skilled in the art, while changes may be made in the details of construction, arrangement and proportion of the parts without departing from the spirit of the present invention. Nor is the invention to be restricted to the particular use selected for exemplifying the utility of the construction described, as embodiments of the present invention may be applied to other uses as will now be apparent to those skilled in the art. Reference is therefore to be had to the appended claims for a definition of said invention.

What is claimed is:

1. In a refrigerating system having an evaporator subjected to the space to be refrigerated, means for compensating for changes in the temperature of the atmosphere outside of said space including an expansion valve for controlling the flow of refrigerant to the evaporator, a pressure responsive device associated therewith and adapted to effect the opening and closing of said valve in response to changes of fluid pressure in the evaporator, resilient means cooperating with said pressure responsive device for predetermining the fluid pressure to be maintained thereby in the evaporator, and thermostatic means subjected to atmospheric temperature outside of said space and acting in conjunction with said pressure responsive device to decrease the fluid pressure maintained by said pressure responsive device in the evaporator as the temperature of the atmosphere increases.

2. In a refrigerating system having an evaporator subjected to the space to be refrigerated, means for compensating for changes in the temperature of the atmosphere outside of said space including an expansion valve for controlling the flow of refrigerant to the evaporator, a pressure responsive device associated therewith and adapted to effect the opening and closing of said valve, resilient means cooperating with said pressure responsive device to predetermine the pressure to be maintained thereby in the evaporator, means to adjust the resilient pressure acting on said pressure responsive device to initially predetermine the pressure to be maintained thereby in the evaporator, and thermostatic means subjected to the temperature of the atmosphere outside of said space and acting in conjunction with said pressure responsive device to automatically decrease the fluid pressure maintained in the evaporator by said pressure responsive device as the temperature of the atmosphere increases.

3. In a refrigerating system having an evaporator subjected to the space to be refrigerated, means for compensating for changes in the temperature of the atmosphere outside of said space including an expansion valve for controlling the flow of refrigerant to the evaporator, a pressure responsive device associated therewith and adapted to effect the opening and closing of said valve, a spring exerting a predetermined pressure on said pressure responsive device, a second spring acting in opposition to said first named spring and cooperating therewith whereby the pressure to be maintained by said pressure responsive device in said evaporator is determined by the difference in pressure exerted on said pressure responsive device by said two springs, and thermostatic means subjected to atmospheric temperature outside of said space for automatically varying the adjustment of one of said springs to vary the difference in pressure exerted by said springs on said pressure responsive device to decrease the pressure in said evaporator as a compensation for an increase in the temperature to which said thermostatic means is subjected.

4. In a refrigerating system having an evaporator subjected to the space to be refrigerated, means for compensating for changes in the temperature of the atmosphere outside of said space including an expansion valve for controlling the flow of refrigerant to the evaporator, a pressure responsive device associated therewith and subjected to the pressure in the evaporator for effecting the opening and closing of said valve, a spring exerting a predetermined pressure on said pressure responsive device, a second spring acting in opposition to said first named spring and cooperating therewith whereby the pressure to be maintained by said pressure responsive device is determined by the difference in pressure exerted on said pressure responsive device by said two springs, and thermostatic means subjected to atmospheric temperature outside of said space and cooperating with said second named spring to vary its adjustment and decrease the differential action of said springs on said pressure responsive device as the temperature of the atmosphere is increased.

5. In a refrigerating system having an evaporator subjected to the space to be refrigerated, means for compensating for changes in the temperature of the atmosphere outside of said space including an expansion valve for controlling the flow of refrigerant to the evaporator, a pressure responsive device associated therewith and subjected to the pressure in the evaporator for effecting the opening and closing of said valve, a spring exerting a predetermined pressure on said pressure responsive device, a second spring acting in opposition to said first named spring and cooperating therewith whereby the pressure to be maintained by said pressure responsive device is determined by the difference in pressure exerted on said pressure responsive device by said two springs, a motor element providing a movable abutment individual to said second named spring, and a bulb subjected to atmospheric temperature outside of said space and communicating with said motor element and constituting therewith a thermostatic device for moving said abutment and varying the adjustment of said second named spring to decrease the difference in pressure of said springs on said pressure responsive device as the temperature to which said bulb is subjected is increased.

6. In a refrigerating system having an evaporator subjected to the space to be refrigerated, means for compensating for changes in the temperature of the atmosphere outside of said space including an expansion valve for controlling the flow of refrigerant to the evaporator, a flexible member associated with said valve and subjected to the pressure in the evaporator, a spring acting in opposition to said pressure and cooperating with said flexible member, a second spring cooperating with said flexible member and acting in opposition to said first named spring whereby the pressure to be maintained is balanced by the difference in pressure exerted by said springs on said flexible member, and thermostatic means subjected to atmospheric temperature outside of said space for automatically decreasing the difference in pressure exerted by said springs upon increase of temperature at the thermostatic means thereby to automatically vary the pressure which will maintain a balanced pressure on said flexible member.

7. In a refrigerating system having an evaporator subjected to the space to be refrigerated, means for compensating for changes in the temperature of the atmosphere outside of said space including an expansion valve for controlling the flow of refrigerant to the evaporator, a flexible member associated with said valve and subjected to the pressure in the evaporator, a spring acting in opposition to said pressure and cooperating with said flexible member, a second spring cooperating with said flexible member and acting in opposition to said first named spring whereby the pressure to be maintained is balanced by the difference in pressure exerted by said springs on said flexible member, a movable abutment individual to one of said springs, and thermostatic means subjected to atmospheric temperature outside of said space for varying the position of said abutment to decrease said difference in pressure as said temperature increases.

8. In a refrigerating system having an evaporator subjected to the space to be refrigerated, means for compensating for changes in the temperature of the atmosphere outside of said space including an expansion valve for controlling the flow of refrigerant to the evaporator including a valve casing provided with a valve seat, a valve member cooperating with said seat, a flexible member associated with said valve and subjected to the pressure in the evaporator, opposed resilient means cooperating with said flexible member and exerting a differential pressure thereon in opposition to the pressure of said fluid, a movable abutment individual to one of said resilient means, a motor vessel associated with said movable abutment, and a bulb subjected to atmospheric temperature outside of said space and communicating with said motor vessel, said bulb and motor element being filled with an expansible liquid whereby increase of temperature at said bulb expands said liquid and moves said abutment to decrease said differential and decrease the fluid pressure in said evaporator required to maintain a balance on said flexible member.

9. In a refrigerating system having an evaporator subjected to the space to be refrigerated, means for compensating for changes in the temperature of the atmosphere outside of said space including an expansion valve for controlling the flow of refrigerating fluid to the evaporator including a valve casing provided with a valve port, a valve member cooperating with said port and provided with a valve stem, a flexible member subjected to the pressure in said evaporator and associated with said stem, a spring cooperating with said flexible member and tending to move said valve in opposition to the pressure of said fluid, a second spring cooperating therewith to move said valve in opposition to said first named spring whereby the pressure of said fluid required to maintain a balance on said flexible member is determined by the difference in pressure of said springs, a movable abutment individual to one of said springs, and thermostatic means subjected to atmospheric pressure outside of said space and associated with said abutment for moving the same to vary the adjustment of said last named spring in conformity with fluctuations of the temperature to which said thermostat is subjected whereby the difference in pressure exerted by said springs is decreased in conformity with increases of atmospheric temperature.

10. In a refrigerating system having an evaporator subjected to the space to be refrigerated, means for compensating for changes in the temperature of the atmosphere outside of said space including an expansion valve for controlling the flow of refrigerant to the evaporator, a pressure responsive device associated therewith and subjected to the pressure in the evaporator for effecting the opening and closing of said valve, resilient means cooperating with said pressure responsive device to predetermine the pressure to be maintained thereby, and thermostatic means subjected to the temperature of the atmosphere outside of said space and cooperating with said resilient means to automatically decrease the resilient pressure exerted by said resilient means on said pressure responsive device as the atmospheric temperature increases whereby the pressure maintained by said pressure responsive device in the evaporator is respectively decreased and increased as the atmospheric temperature increases and decreases to compensate for said changes in atmospheric temperature.

11. In a refrigerating system having an evaporator subjected to the space to be refrigerated, means for compensating for changes in the temperature of the atmosphere outside of said space including an expansion valve for controlling the flow of refrigerant to the evaporator including a valve member and its seat, a pressure responsive device associated therewith and subjected to the pressure in the evaporator for effecting the opening and closing of said valve in response to changes of fluid pressure, opposed resilient means cooperating with said pressure responsive device for opening and closing said valve upon predetermined changes in the fluid pressure acting on said pressure responsive device, a connection between said pressure responsive device and said valve member including a movable abutment for one of said resilient means, and thermostatic means subjected to atmospheric temperature outside of said space and acting on said movable abutment to vary the adjustment of said resilient means and decrease the fluid pressure required to maintain a balance of pressures on said pressure responsive device as the temperature of the atmosphere increases.

12. In a refrigerating system having an evaporator subjected to the space to be refrigerated, means for compensating for changes in the temperature of the atmosphere outside of said space including an expansion valve for controlling the flow of refrigerant to the evaporator, a pressure responsive device associated therewith and subjected to the pressure in the evaporator for effecting the opening and closing of said valve in response to changes of fluid pressure, resilient means cooperating with said pressure responsive device for opening and closing said valve upon predetermined changes in the fluid pressure acting on said pressure responsive device, and thermostatic means subjected to atmospheric temperature outside of said space and acting independently of but in conjunction with said pressure responsive device to decrease the fluid pressure required to close said valve as the temperature of the atmosphere increases.

13. In a refrigerating system having an evaporator subjected to the space to be refrigerated, means for compensating for changes in the temperature of the atmosphere outside of said space including an expansion valve for controlling the flow of refrigerant to the evaporator including a valve member and its seat, a pressure responsive device associated therewith and subjected to the pressure in the evaporator for effecting the opening and closing of said valve in response to changes of fluid pressure, resilient means cooperating with said pressure responsive device for opening and closing said valve upon predetermined changes in the fluid pressure acting on said pressure responsive device, and thermostatic means subjected to atmospheric temperature outside of said space for relatively moving said valve member and its seat to decrease the effect of said resilient means on increase in the temperature to which said thermostatic means is subjected and vice versa whereby changes of temperature at said thermostatic means modify the fluid pressure maintained in said evaporator to compensate for said changes.

14. In a refrigerating system having an evaporator subjected to the space to be refrigerated, means for compensating for changes in the temperature of the atmosphere outside of said space including an expansion valve for controlling the flow of refrigerant to the evaporator including a valve member and its seat, a pressure responsive device associated therewith and subjected to the pressure in the evaporator for effecting the opening and closing of said valve in response to changes of fluid pressure, opposed resilient means cooperating with said pressure responsive device for opening and closing said valve upon predetermined changes in the fluid pressure acting on said pressure responsive device, an adjustable abutment for one of said resilient means, and thermostatic means subjected to atmospheric temperature outside of said space and acting upon increase in temperature to adjust said abutment and decrease the effect of said resilient means whereby an increase in said temperature is accompanied by a compensating decrease in pressure in said evaporator.

JOHN E. DUBE.